(No Model.)
2 Sheets—Sheet 1.
P. BROWNE.
FEED WATER HEATER AND REGULATOR.
No. 516,518.
Patented Mar. 13, 1894.
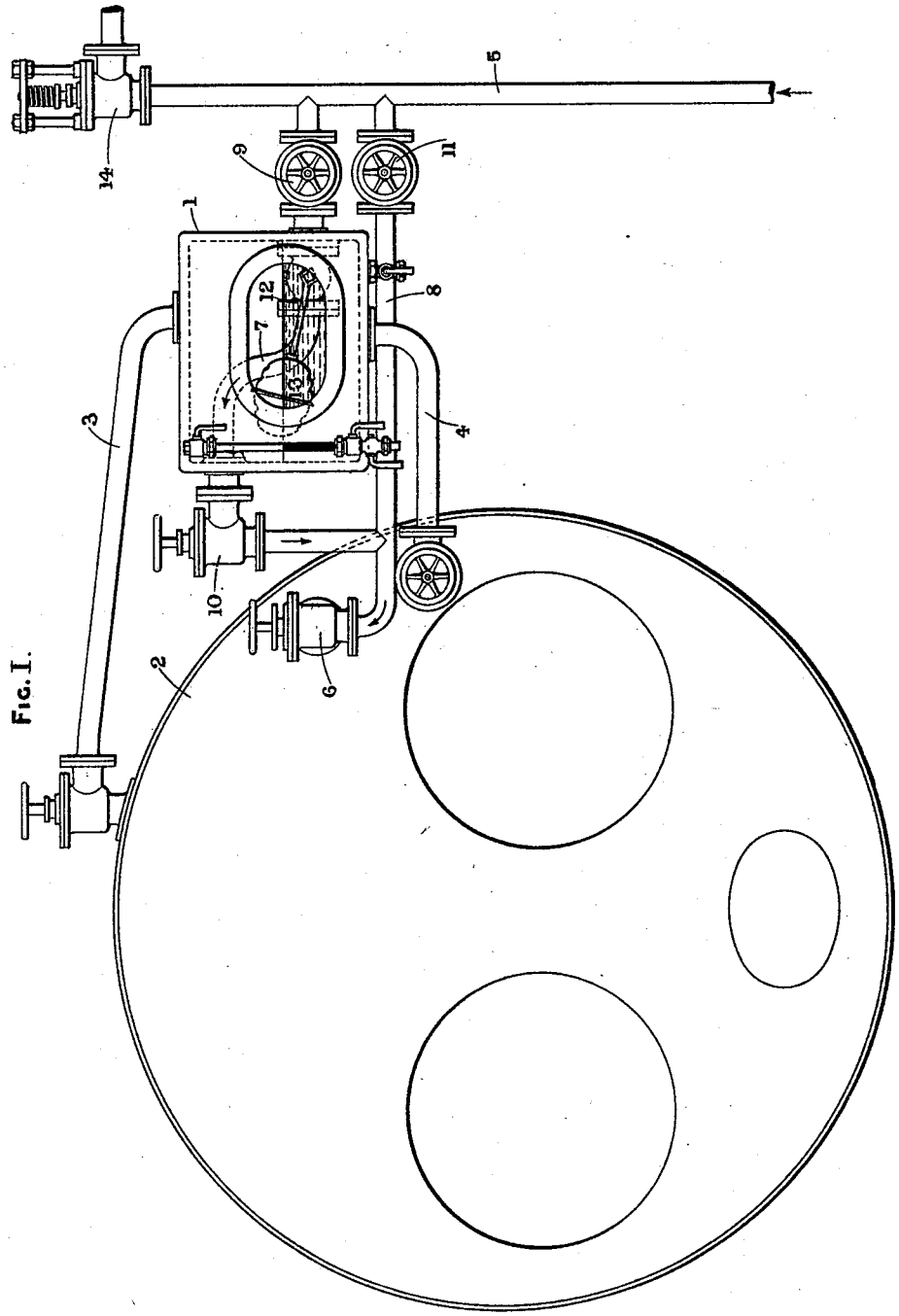
Fig. I.
Attest
Walter Donaldson
F. L. Middleton
Inventor
Phillip Browne
by Ellis Spear
Atty.
THE NATIONAL LITHOGRAPHING COMPANY,
WASHINGTON, D. C.

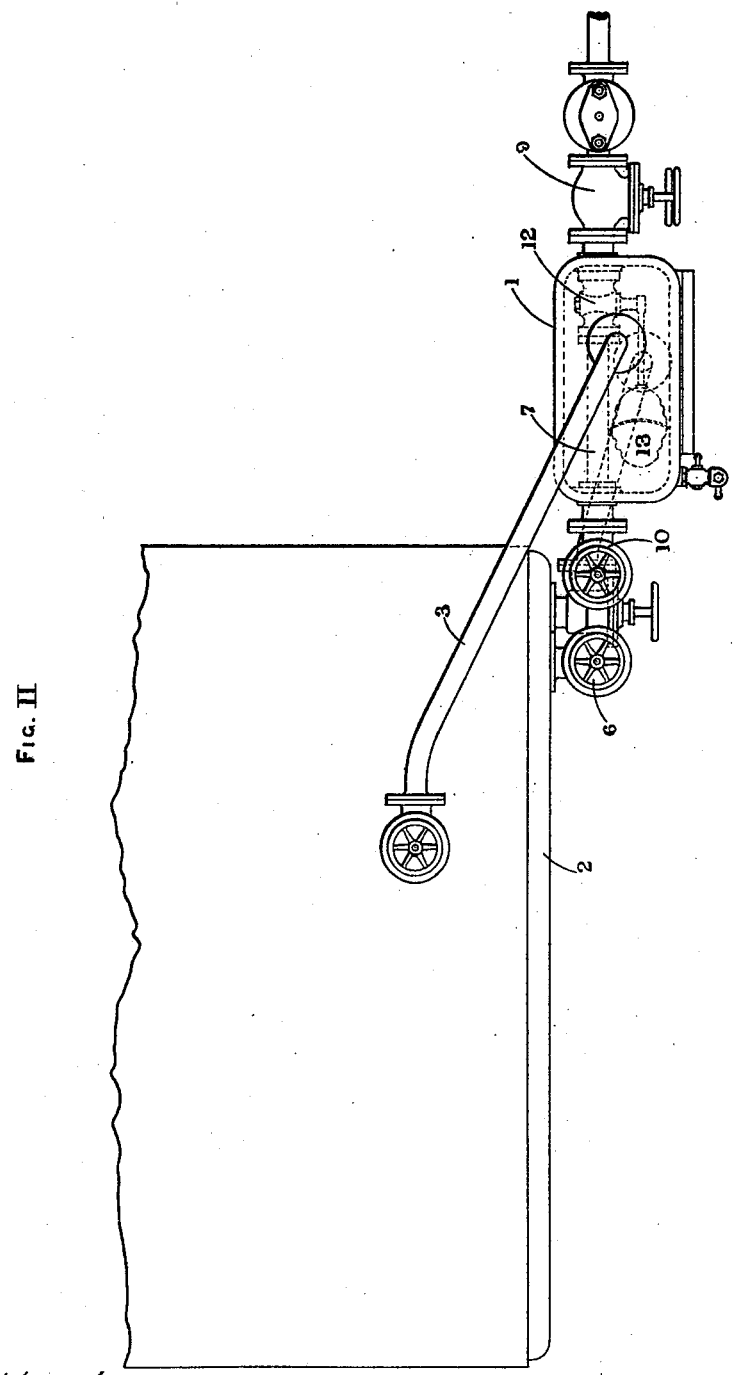

UNITED STATES PATENT OFFICE.

PHILLIP BROWNE, OF BOOTLE, NEAR LIVERPOOL, ENGLAND.

FEED-WATER HEATER AND REGULATOR.

SPECIFICATION forming part of Letters Patent No. 516,518, dated March 13, 1894.

Application filed February 27, 1893. Renewed January 15, 1894. Serial No. 496,996. (No model.)

*To all whom it may concern:*

Be it known that I, PHILLIP BROWNE, a subject of the Queen of Great Britain, residing in Bootle, near Liverpool, in the county of Lancaster, England, have invented certain new and useful Improvements in Feed-Water Heaters and Regulators, of which the following is a specification.

This invention relates to apparatus for heating and regulating the supply of feed water for boilers and has for its object the heating of the feed water and the automatic maintenance of the normal level of water in the boiler.

In the accompanying drawings which serve to illustrate my invention, Figure I is an elevation of the apparatus fitted to an ordinary double flued boiler and Fig. II is a plan.

In the two views the same parts are indicated by the same reference figures, and the direction of flow is indicated by the arrows.

1 is a closed tank situated near the boiler 2 and connected therewith by the two pipes 3 and 4, which lead from the steam space and water space respectively and which serve to maintain the water in the tank at the same level as that in the boiler; the pipes are controlled by the stop valves shown.

5 is the feed pipe from the feed pump and 6 is the boiler feed check valve. The feed pipe is connected to the feed check valve by the pipe 7 which passes through the tank and also by the by-pass pipe 8, the former being controlled by the valves 9 and 10 and the cock or valve 12 as hereinafter described, and the latter by the valve 11. Under normal circumstances the valve 11 is closed and the feed water on its way to the boiler passes through the pipe 7; I fit to this pipe within the tank 1, a regulating valve or cock 12, controlled by the float 13 which is operated by the rise and fall of the water level in the tank, which, as before stated, is the same as that in the boiler. The regulating cock 12 and the lower portion of the pipe 7 are below the water level but a portion of the pipe 7 is preferably bent up so as to be surrounded by the live steam in the upper part of the tank, and the regulating cock is so adjusted that when the water reaches the normal level the cock is just sufficiently open to maintain the water at this level. A relief valve 14 is fitted to the feed pipe so that when the regulating cock 12 is closed the feed water is pumped through the relief valve 14, loaded to a pressure in excess of the boiler pressure, either into a tank, or back to the hot well of the engine, as may be desired.

Should it be desired to isolate the tank, the valves 9 and 10 are closed and 11 is opened, when the feed water enters the boiler by the by-pass pipe 8.

The tank is fitted with a gage glass and has a man-hole, the cover of which is removed in Fig. I.

The action of the apparatus is as follows:—Assuming the by-pass valve 11 to be closed and the valves 9 and 10 open, the feed water will pass through the pipe 7 and be thereby heated before being delivered to the boiler and the supply to the boiler will be automatically regulated inasmuch as the opening of the regulating cock will vary in accordance with the rise and fall of the water level; the apparatus thus heats the feed water and regulates the supply thereof.

Having now fully described my invention, what I claim, and desire to secure by Letters Patent, is—

1. In combination with a boiler, a tank having its upper portion connected with the steam space and its lower portion connected with the water space of the boiler, a feed water pipe passing through the tank, a regulating valve fitted to the feed water pipe within the tank, a float controlled by the rise and fall of the water connected to the valve, and a branch pipe connected with the feed water pipe provided with a relief valve operated by the excess of pressure when the flow of water to the boiler is cut off, substantially as described.

2. In combination with a boiler; a tank the upper portion of which is connected to the steam space and the lower portion to the water space of the boiler; a feed pipe which is bifurcated, one branch passing through said tank and being fitted with a regulating cock placed within the tank and controlled by the rise and fall of the water level in the tank, and the other branch forming a by-pass pipe to the boiler, and a relief valve fitted to the feed pipe, substantially as described and illustrated.

3. In combination with a boiler; a tank 1 connected to the boiler by the pipes 3 and 4; the bifurcated feed pipe 5 one branch 7 passing through the tank and being fitted with isolating valves 9 and 10 and a cock 12 within the tank controlled by a float 13 operated by the rise and fall of the water level in the tank, and the other branch forming a by-pass pipe 8 controlled by the valve 11, and a relief valve 14 fitted to the feed pipe substantially as described and illustrated.

4. In combination with the boiler and the tank 1 the part of the feed pipe 7 within the tank being so curved that a portion thereof is in the steam space and a portion in the water space of the tank, substantially as described and illustrated.

5. In combination with the boiler and the tank 1 connected to the boiler by the pipes 3 and 4, the feed pipe passing through the tank, the regulating valve 12 the isolating valves 9 and 10, and the by pass 8 substantially as described.

In testimony whereof I have hereunto set my hand in the presence of two subscribing witnesses.

PHILLIP BROWNE.

Witnesses:
ROBERT A. SLOAN,
J. E. LLOYD BARNES,
*Patent Agents, 26 Castle Street, Liverpool.*